US010940798B2

(12) United States Patent
Mano et al.

(10) Patent No.: US 10,940,798 B2
(45) Date of Patent: Mar. 9, 2021

(54) CAMERA MONITOR SYSTEM

(71) Applicant: KOITO MANUFACTURING CO., LTD., Tokyo (JP)

(72) Inventors: Mitsuharu Mano, Shizuoka (JP); Kosuke Mitani, Shizuoka (JP); Naoki Tatara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 32 days.

(21) Appl. No.: 15/701,984

(22) Filed: Sep. 12, 2017

(65) Prior Publication Data
US 2018/0072229 A1    Mar. 15, 2018

(30) Foreign Application Priority Data

Sep. 15, 2016  (JP) ................................ 2016-180113

(51) Int. Cl.
*B60R 1/00*    (2006.01)
*G06F 3/14*    (2006.01)
(Continued)

(52) U.S. Cl.
CPC ................ *B60R 1/00* (2013.01); *B60R 16/03* (2013.01); *G06F 3/147* (2013.01); *G06F 3/1423* (2013.01); *H04N 5/23241* (2013.01); *H04N 5/232941* (2018.08); *H04N 5/57* (2013.01); *H04N 5/63* (2013.01); *H04N 7/181* (2013.01); *B60R 2300/105* (2013.01); *B60R 2300/404* (2013.01);
(Continued)

(58) Field of Classification Search
None
See application file for complete search history.

(56) References Cited

U.S. PATENT DOCUMENTS 7,505,843 B2 *  3/2009  Okada .................. B60R 25/102
                                                        342/354
2004/0254713 A1  12/2004  Okada et al.
(Continued)

FOREIGN PATENT DOCUMENTS

CN    204926217 U    12/2015
JP    2002-12058 A    1/2002
(Continued)

OTHER PUBLICATIONS

Communication dated Dec. 3, 2019, issued by the State Intellectual Property Office of the P.R.C. in corresponding Chinese Application No. 201710817522.4.
(Continued)

*Primary Examiner* — Stuart D Bennett
(74) *Attorney, Agent, or Firm* — Sughrue Mion, PLLC

(57) ABSTRACT

A camera monitor system includes: a capturing device; a displaying device; a detecting device detecting at least one of a state of an engine switch of a vehicle, a state of an engine, a state of a gear shift, an open/closed state of a door, and a seated state of a driver; and a control device controlling consumed power by the capturing device and the displaying device on the basis of at least one type of detection output of the detecting device. The control device controls at least one of the capturing device and the displaying device to a low power consumption state when a specified time elapses since the detection output of the detecting device is changed.

8 Claims, 8 Drawing Sheets

| MODE | SENSOR ||||||| POWER SAVING MODE ||||
|---|---|---|---|---|---|---|---|---|---|---|---|
| | EG SWITCH | ENGINE | DOOR | SEAT | SHIFT | TIMER | BODY ECU | CAMERA ECU | MONITOR ECU | CAMERA | MONITOR |
| M1 | IG | DRIVEN | OPEN/CLOSED | PRESENT/ABSENT | D·R | - | NORMAL | NORMAL | NORMAL | ON | ON |
| M2 | IG | DRIVEN | CLOSED | PRESENT | P | 7 MINUTES | NORMAL | NORMAL | NORMAL | ON | DIMMED |
| M3 | IG | DRIVEN | OPEN | ABSENT | P | - | NORMAL | NORMAL | NORMAL | ON | DIMMED |
| M4 | ACC | STOP | OPEN/CLOSED | PRESENT/ABSENT | P | - | ECO | NORMAL | NORMAL | ON | ON |
| M5 | ACC | STOP | CLOSED | ABSENT | P | 7 MINUTES | ECO | NORMAL | NORMAL | ON | STANDBY |
| M6 | OFF | STOP | OPEN | PRESENT | P | - | ECO | NORMAL | NORMAL | ON | ON |
| M7 | OFF | STOP | OPEN | ABSENT | P | - | ECO | NORMAL | NORMAL | ON | DIMMED |
| M8 | OFF | STOP | OPEN | - | P | 2 MINUTES | ECO | NORMAL | NORMAL | ON | STANDBY |
| M9 | OFF | STOP | OPEN | - | P | 7 MINUTES | ECO | ECO | ECO | ON | STANDBY |
| M10 | OFF | STOP | CLOSED | - | P | - | ECO | NORMAL | NORMAL | ON | ON |
| M11 | OFF | STOP | CLOSED | PRESENT | P | 2 MINUTES | ECO | NORMAL | NORMAL | ON | DIMMED |
| M12 | OFF | STOP | CLOSED | PRESENT | P | 7 MINUTES | ECO | ECO | ECO | ON | STANDBY |
| M13 | OFF | STOP | CLOSED | ABSENT | P | 2 MINUTES | ECO | NORMAL | NORMAL | ON | STANDBY |
| M14 | OFF | STOP | CLOSED | ABSENT | P | 7 MINUTES | ECO | ECO | ECO | OFF | OFF |

(51) Int. Cl.
*G06F 3/147* (2006.01)
*H04N 5/232* (2006.01)
*B60R 16/03* (2006.01)
*H04N 5/57* (2006.01)
*H04N 5/63* (2006.01)
*H04N 7/18* (2006.01)

(52) U.S. Cl.
CPC ..... *B60R 2300/70* (2013.01); *B60R 2300/802* (2013.01); *B60R 2300/8066* (2013.01); *G09G 2330/021* (2013.01); *G09G 2330/022* (2013.01); *G09G 2380/10* (2013.01); *H04N 5/23293* (2013.01)

(56) References Cited

U.S. PATENT DOCUMENTS

2007/0185644 A1* 8/2007 Hirose ................. G01C 21/265
 701/532
2012/0078469 A1* 3/2012 Karner ................ B29C 45/0017
 701/36
2016/0159283 A1 6/2016 Lynam
2017/0343799 A1* 11/2017 Ito ...................... G02B 27/0101
2017/0344826 A1* 11/2017 Kanematsu .............. B60Q 9/00

FOREIGN PATENT DOCUMENTS

| JP | 2002012058 A | * | 1/2002 |
| JP | 2009-83618 A | | 4/2009 |
| JP | 2015-226233 A | | 12/2015 |
| JP | 2017-213933 A | | 12/2017 |

OTHER PUBLICATIONS

Communication dated Apr. 7, 2020, from the Japanese Patent Office in Application No. 2016-180113.

* cited by examiner

FIG. 4

| MODE | SENSOR ||||| | | POWER SAVING MODE |||||
|---|---|---|---|---|---|---|---|---|---|---|---|
| | EG SWITCH | ENGINE | DOOR | SEAT | SHIFT | TIMER | BODY ECU | CAMERA ECU | MONITOR ECU | CAMERA | MONITOR |
| M1 | IG | DRIVEN | OPEN/CLOSED | PRESENT/ABSENT | D·R | - | NORMAL | NORMAL | NORMAL | ON | ON |
| M2 | IG | DRIVEN | CLOSED | PRESENT | P | 7 MINUTES | NORMAL | NORMAL | NORMAL | ON | DIMMED |
| M3 | IG | DRIVEN | OPEN | ABSENT | P | - | NORMAL | NORMAL | NORMAL | ON | DIMMED |
| M4 | ACC | STOP | OPEN/CLOSED | PRESENT/ABSENT | P | - | ECO | NORMAL | NORMAL | ON | ON |
| M5 | ACC | STOP | CLOSED | ABSENT | P | 7 MINUTES | ECO | NORMAL | NORMAL | ON | STANDBY |
| M6 | OFF | STOP | OPEN | PRESENT | P | - | ECO | NORMAL | NORMAL | ON | ON |
| M7 | OFF | STOP | OPEN | ABSENT | P | - | ECO | NORMAL | NORMAL | ON | DIMMED |
| M8 | OFF | STOP | OPEN | - | P | 2 MINUTES | ECO | NORMAL | NORMAL | ON | STANDBY |
| M9 | OFF | STOP | OPEN | - | P | 7 MINUTES | ECO | NORMAL | ECO | ON | STANDBY |
| M10 | OFF | STOP | CLOSED | - | P | 2 MINUTES | ECO | NORMAL | NORMAL | ON | ON |
| M11 | OFF | STOP | CLOSED | PRESENT | P | 2 MINUTES | ECO | NORMAL | NORMAL | ON | DIMMED |
| M12 | OFF | STOP | CLOSED | PRESENT | P | 7 MINUTES | ECO | ECO | NORMAL | ON | STANDBY |
| M13 | OFF | STOP | CLOSED | ABSENT | P | 2 MINUTES | ECO | NORMAL | NORMAL | ON | STANDBY |
| M14 | OFF | STOP | CLOSED | ABSENT | P | 7 MINUTES | ECO | ECO | ECO | OFF | OFF |

CAMERA MONITOR SYSTEM

INCORPORATION BY REFERENCE

The disclosure of Japanese Patent Application No. 2016-180113 filed on Sep. 15, 2016 including the specification, drawings and abstract is incorporated herein by reference in its entirety.

BACKGROUND

1. Technical Field

The disclosure relates to a camera monitor system (referred to as a CMS) that displays images captured by cameras provided on left and right sides of an automobile on a monitor.

2. Description of Related Art

In recent years, a mirrorless automobile has been taken into consideration. In Japanese Patent Application Publication No. 2015-226233 (JP 2015-226233 A), a CMS is proposed. Instead of left and right side mirrors of an automobile, the CMS is configured by including: left and right side cameras that respectively capture a rear area of the automobile from left and right side areas thereof; and a monitor that is disposed at a position where an occupant in a vehicle cabin can visually recognize the monitor and that displays images captured by the side cameras. The plural occupants that include not only a driver but also include occupants in a passenger's seat and a rear seat can visually recognize the image displayed on the monitor, and thus, the CMS is extremely effective in securement of safe travel of the automobile.

SUMMARY

In such a CMS, when a power supply system of the automobile is turned OFF and a power supply to the CMS is stopped, the monitor stops displaying the images, and the occupants are no longer able to check the sides and the rear of the automobile. Accordingly, the CMS is preferably configured that, under a specified circumstance, the monitor displays the images, for example, as long as the driver is in the vehicle cabin even after an engine is stopped. Alternatively, the CMS is preferably configured that, even when an engine switch is OFF, the monitor starts displaying the images at a moment the driver gets in the automobile.

From a safety perspective, it is preferred to increase a situation where the monitor displays the images as much as possible or to extend a time of the monitor displaying the images. However, in such a case, consumed power by the monitor that displays the images becomes problematic. In particular, the power consumption by the CMS affects traveling performance of an electric vehicle, a hybrid vehicle, or the like that has a battery as a power supply. For this reason, it is preferred that, while safety is secured by the CMS, the monitor stops displaying the images when necessity is low, or the consumed power by the CMS is reduced.

The disclosure provides a CMS that can save power while securing safety of an automobile.

A camera monitor system according to an aspect of the disclosure includes: a capturing device capturing an image of an outside of a vehicle; a displaying device displaying the captured image; a detecting device detecting at least one of a state of an engine switch of the vehicle, a state of an engine, a state of a gear shift, an open/closed state of a door, and a seated state of a driver; and a control device controlling consumed power by the capturing device and the displaying device on the basis of at least one type of detection output of the detecting device. The control device controls at least one of the capturing device and the displaying device to a low power consumption state when a specified time elapses since the detection output of the detecting device is changed.

In the above aspect, the capturing device may be left and right cameras, each of which captures an image of an area from a side to a rear of an automobile, and the displaying device may be left and right monitors that respectively display left and right captured images.

In the above aspect, the control device may control a display screen of the displaying device to be dimmed after a specified time elapses since the gear shift is set in parking in the case where the engine is driven. In addition, in the above aspect, in the case where the engine is stopped, the control device may bring the displaying device into a standby state after a first specified time elapses since the door is closed, and may control the displaying device to be OFF after a second specified time that is longer than the first specified time elapses. Furthermore, in the above aspect, the control device may control the displaying device to be operated normally when detecting that the driver is seated while the engine is stopped and the door is open, and may control the displaying device to the standby state when detecting that the driver is not seated. Moreover, in the above aspect, the control device may control the displaying device to be dimmed when the engine is stopped and a specified time elapses since the gear shift is set in parking. In the above aspect, the control device may turn off the control to the low power consumption state through an operation by a driver.

According to this aspect, the normal operation of the displaying device is maintained in a situation where it is considered that the occupant such as the driver has to check the image displayed on the displaying device to secure safe travel of the automobile and to secure safety during getting on and off of the occupant. In the case where such necessity that the occupant visually recognizes the image displayed on the displaying device to secure the safe travel is low, power consumed by the displaying device and the capturing device is reduced. In this way, low power consumption of the automobile is realized.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table that shows control modes of the CMS;

DETAILED DESCRIPTION OF EMBODIMENTS

Figure 1:
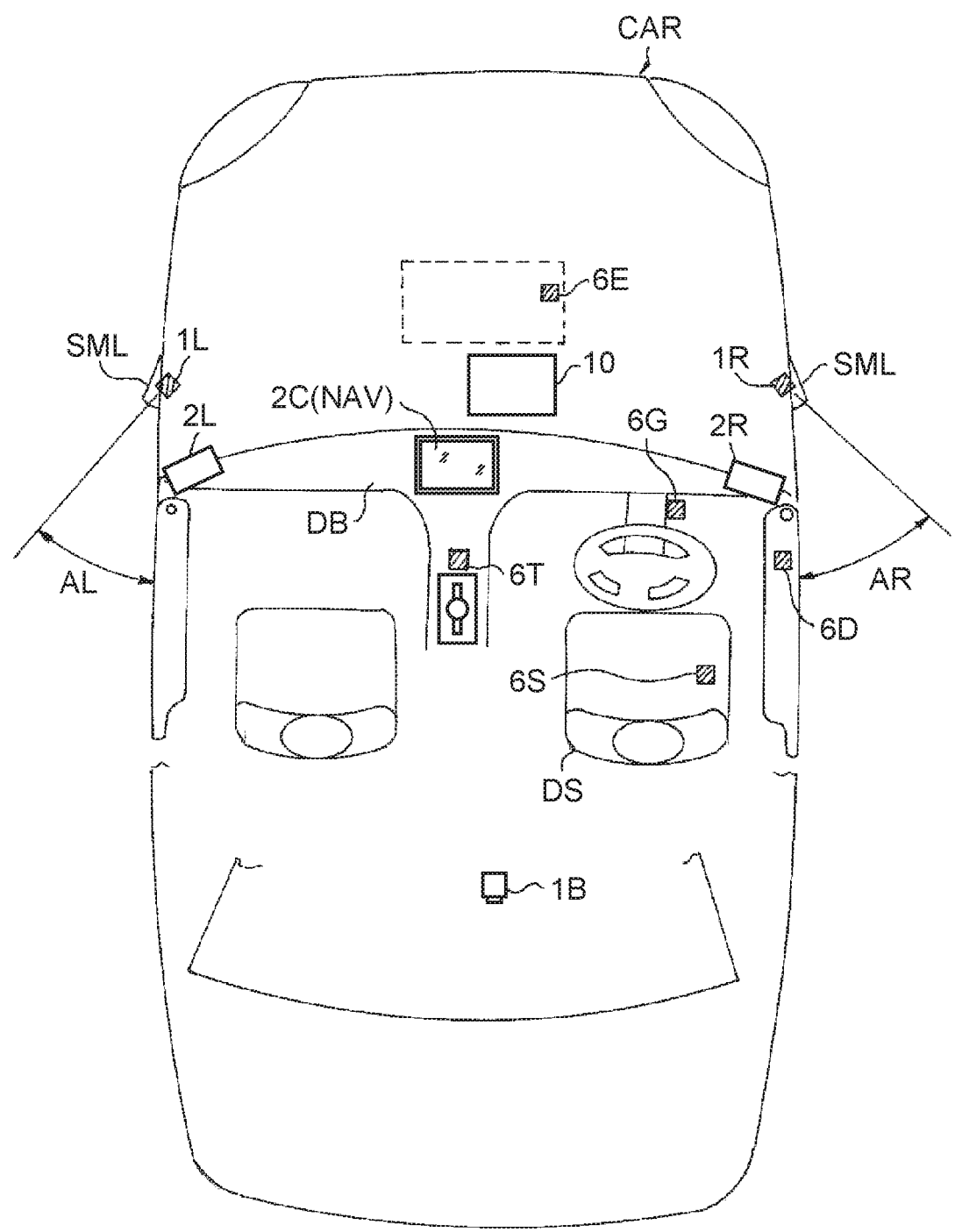
FIG. 1 is a schematic plan view of an automobile that includes a CMS of the disclosure.

Next, a description will be made on an embodiment of the disclosure with reference to the drawings. FIG. 1 is a schematic plan view of an automobile on which a CMS of the disclosure is mounted. Side mirrors are not provided on left and right sides on an exterior of a vehicle body of an automobile CAR. Left and right side cameras 1L, 1R are respectively disposed in lamp housings of left and right side marker lamps SML. The left side camera 1L captures an image from a left side area to a rear left area AL of the automobile CAR. The right side camera 1R captures an image from a right side area to a rear right area AR of the automobile CAR. Hereinafter, both of the side cameras 1L, 1R will collectively be referred to as a camera 1.

Figure 2:
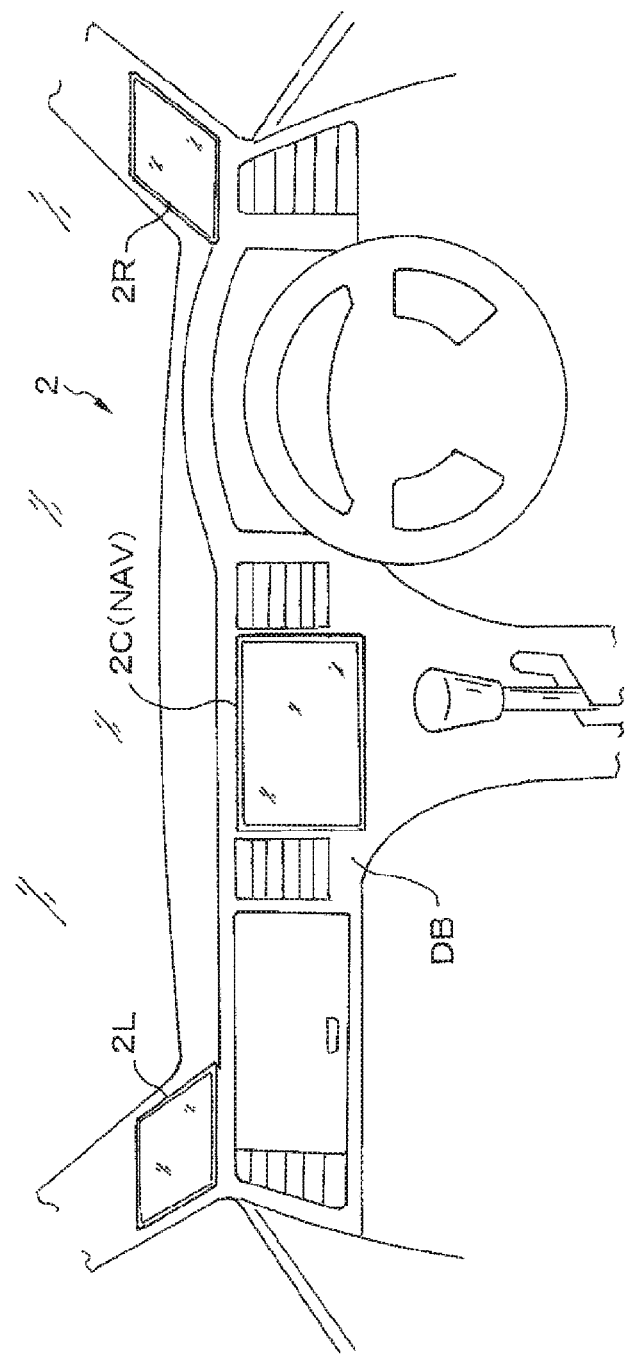
FIG. 2 is a schematic view of a dashboard showing a monitor configuration.

FIG. 2 is a schematic front view of a front area of a driver's seat DS in a vehicle cabin of the automobile CAR, that is, a dashboard DB herein. In the drawing, three monitors are aligned in a horizontal direction. Center one is a center monitor 2C, and a left side monitor 2L and a right side monitor 2R are respectively disposed at left and right ends of the dashboard DB, that is, in inner areas of left and right front pillars. The center monitor 2C is configured herein as a display screen of a navigation system NAV. The left side monitor 2L displays the image captured by the left side camera 1L, and the right side monitor 2R displays the image captured by the right side camera 1R. Hereinafter, both of the side monitors 2L, 2R will collectively be referred to as a monitor 2.

The left and right side cameras 1L, 1R and the left and right side monitors 2L, 2R described above are electrically connected to a CMS body 10. Through control by this CMS body 10, display of the captured images is controlled, and power saving control of consumed power, which will be described below, is executed.

Figure 3:
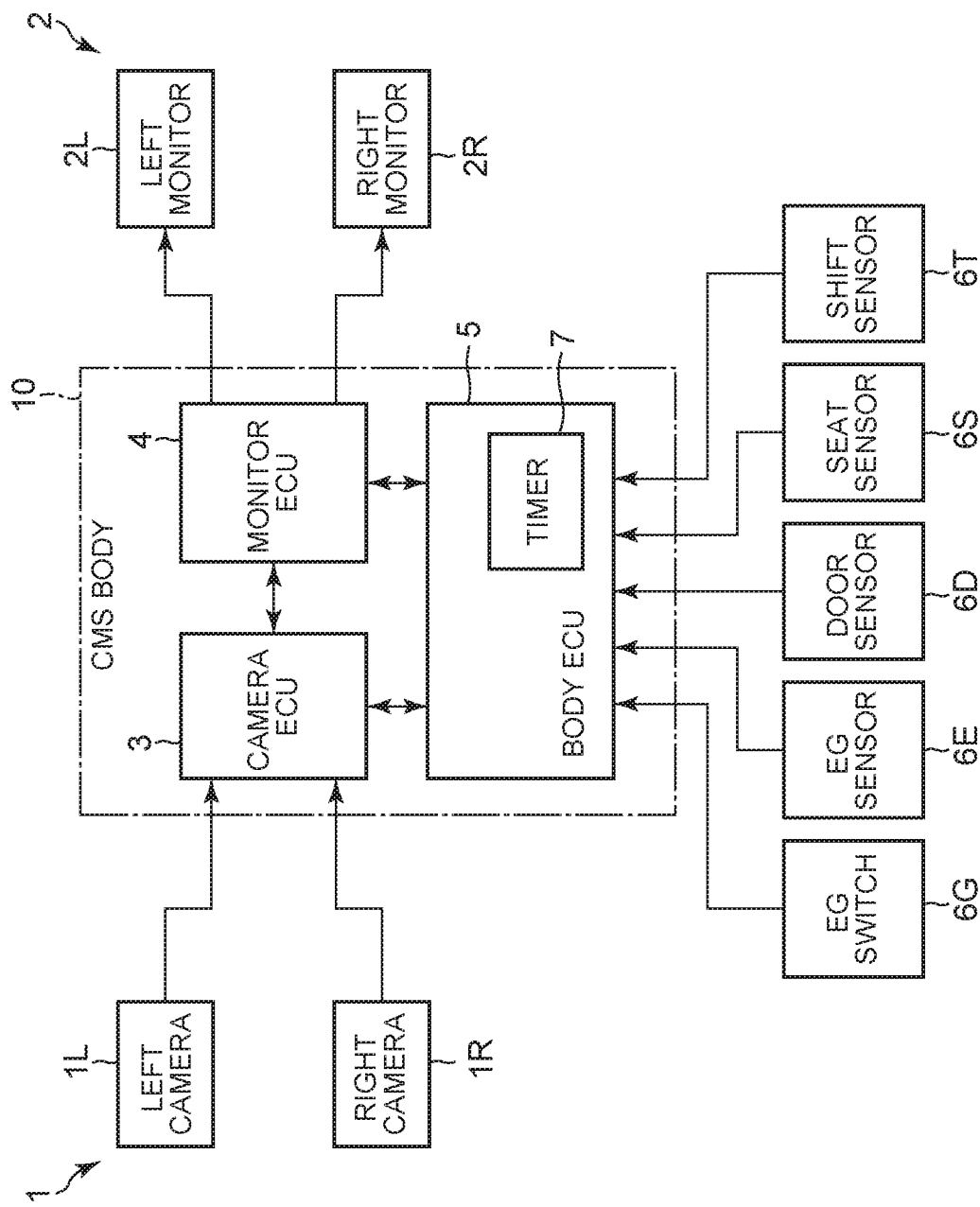
FIG. 3 is a block diagram of a configuration of the CMS.

FIG. 3 is a block diagram of a configuration of the CMS in the embodiment. The CMS body 10 is provided with: a camera ECU 3 that controls the left and right side cameras 1L, 1R; and a monitor ECU 4 that controls the left and right side monitors 2L, 2R. The camera ECU 3 executes signal processing of captured signals captured by the left and right side cameras 1L, 1R and outputs the captured signals as image signals to the monitor ECU 4. The monitor ECU 4 executes signal processing of the image signals to make them the image signals of a type that conforms to the display on the monitor, and outputs the image signals to the left and right side monitors 2L, 2R.

As an ECU that executes main control of the CMS, a body ECU 5 that is mounted on the automobile herein is used in the CMS body 10. This body ECU 5 is configured to control the camera ECU 3 and the monitor ECU 4 as will be described below and control operations of the left and right side cameras 1L, 1R and the left and right side monitors 2L, 2R via these camera ECU 3 and monitor ECU 4 as will be described below.

Plural sensors are connected to the body ECU 5. Here, as the sensors, an EG switch 6G that detects a switching state of an engine switch, a door sensor 6D that detects an open/closed state of a driver's seat door, a seat sensor 6S that detects that a person (the driver) is seated on the driver's seat DS, a shift sensor 6T that detects a switching state of a gear shift of a transmission, and an engine sensor 6E that detects whether an engine is driven or stopped are connected to the body ECU 5. In addition, a timer 7 is installed in the body ECU 5, and the timer 7 measures a time since a specified detection signal is input. Next, a description will be made on a detection operation of each of these sensors.

EG Switch 6G

The EG switch 6G detects a switching position of the EG switch 6G and detects the following states. "OFF": the EG switch 6G detects a state where the EG switch is OFF. "ACC": the EG switch 6G detects a state where the EG switch is switched to an ACC (accessory). While electrical equipment such as a radio and the navigation system are ON, the engine is in a stopped state. "IG": the EG switch 6G detects a state where the EG switch is switched to IG. Normally, the engine is in a driven state; however, there is a case where the engine is in a state before being started.

Door Sensor 6D

The door sensor 6D detects opening/closing of the driver's seat door and detects the following states. "Open": a state where the driver's seat door is open, and "closed": a state where the driver's seat door is closed.

Seat Sensor 6S

The seat sensor 6S is constructed of a pressure sensitive sensor that is provided in the driver's seat, and detects the following state. "Present": the seat sensor 6S detects a state where the person is seated on the driver's seat. "Absent": the seat sensor 6S detects a state where the person is not seated on the driver's seat.

Shift Sensor 6T

The shift sensor 6T detects the following states from a shift lever position of the transmission of the automobile. "P": the shift sensor 6T detects a P (parking) state of the shift lever. "D·R": the shift sensor 6T detects a D (forward traveling) state or an R (reverse) state of the shift lever position. "N": the shift sensor 6T detects an N (neutral) state of the shift lever position.

Engine Sensor 6E

The engine sensor 6E detects the following states from a rotational speed of an engine output shaft. "Engine drive": the engine sensor 6E detects a state where the engine is driven. "Engine stop": the engine sensor 6E detects a state where the engine is stopped.

Based on the detection signal that is detected by each of the above sensors, the body ECU 5 controls consumed power by itself (the body ECU 5), controls the consumed power by the camera ECU 3 and the monitor ECU 4, and further controls the consumed power by the left and right side cameras 1L, 1R and the left and right monitors 2L, 2R. As control modes of the consumed power by these body ECU 5, the camera ECU 3, and the monitor ECU 4, the following control modes are enabled.

Body ECU 5

"Normal": all electrical components mounted on the automobile, that is, each of the electrical components that is required for traveling of the automobile is controlled. Control of the CMS is included therein, and the camera 1, the monitor 2, the camera ECU 3, and the monitor ECU 4 that constitute CMS control are controlled. "ECO": while control related to the CMS is secured, the rest of the control is stopped when necessary or becomes redundancy control. The consumed power can be reduced by stopping or the redundancy control.

Camera ECU 3

"Normal": when the captured signal captured by the camera is input, the captured signal is subjected to the signal processing to generate the specified image signal, and this image signal is output to the monitor ECU. "ECO": the signal processing of the captured signal is stopped. Alternatively, the signal processing is executed; however, redundancy signal processing is executed when compared to "normal" time. The image signal is output as the image signal, a frame of which is dropped. The consumed power is the low consumed power.

Monitor ECU 4

"Normal": the image signal from the camera ECU 3 is subjected to the signal processing to generate a display signal, and the display signal is output to the monitor 2. "ECO": the signal processing of the image signal is stopped. Alternatively, the signal processing is executed; however, redundancy signal processing is executed when compared to "normal" time. The image signal is output as the display signal, a frame of which is dropped. The consumed power is the low consumed power.

Camera 1 (Side Cameras 1L, 1R)

"ON": A power supply of the camera is ON, the captured signal is output from a capturing element installed in the camera to the camera ECU. "OFF": The power supply of the camera is OFF, and a capturing operation is stopped. The consumed power becomes nearly zero.

Monitor 2 (Side Monitors 2L, 2R)

"OFF": A power supply is OFF, and the image is not displayed. "ON": the power supply is ON, and the image is normally displayed. "Dimmed": while the image is displayed on the display screen, intensity of a backlight is lowered, and display luminance is lowered. "Standby": a power supply of the backlight and the like of the display screen is OFF, which leads to a blackout state where the image is not displayed. Differing from OFF, the monitor 2 can instantaneously be resumed to an image displaying state.

Note that, although not shown, an indicator that is constructed of an LED or the like may be attached to the monitor 2. For example, when the indicator is lit during "standby", it indicates that the monitor in a low consumed power state is in a "standby" state. In this way, the "standby" state can be distinguished from failure or the like of the monitor. A descending order in an amount of the consumed power by this monitor is ON>dimmed>standby>OFF.

As control modes of power saving, such as a reduction or suppression of the consumed power, in the CMS that is configured as described so far, control modes in modes M1 to M14 can be realized in this embodiment. FIG. 4 is a table of the modes M1 to M14, and these modes M1 to M14 will sequentially be described with reference to this FIG. 4 and flowcharts in FIG. 5 to FIG. 8, which will be shown below.

Modes M1, M2, M3

Figure 5:
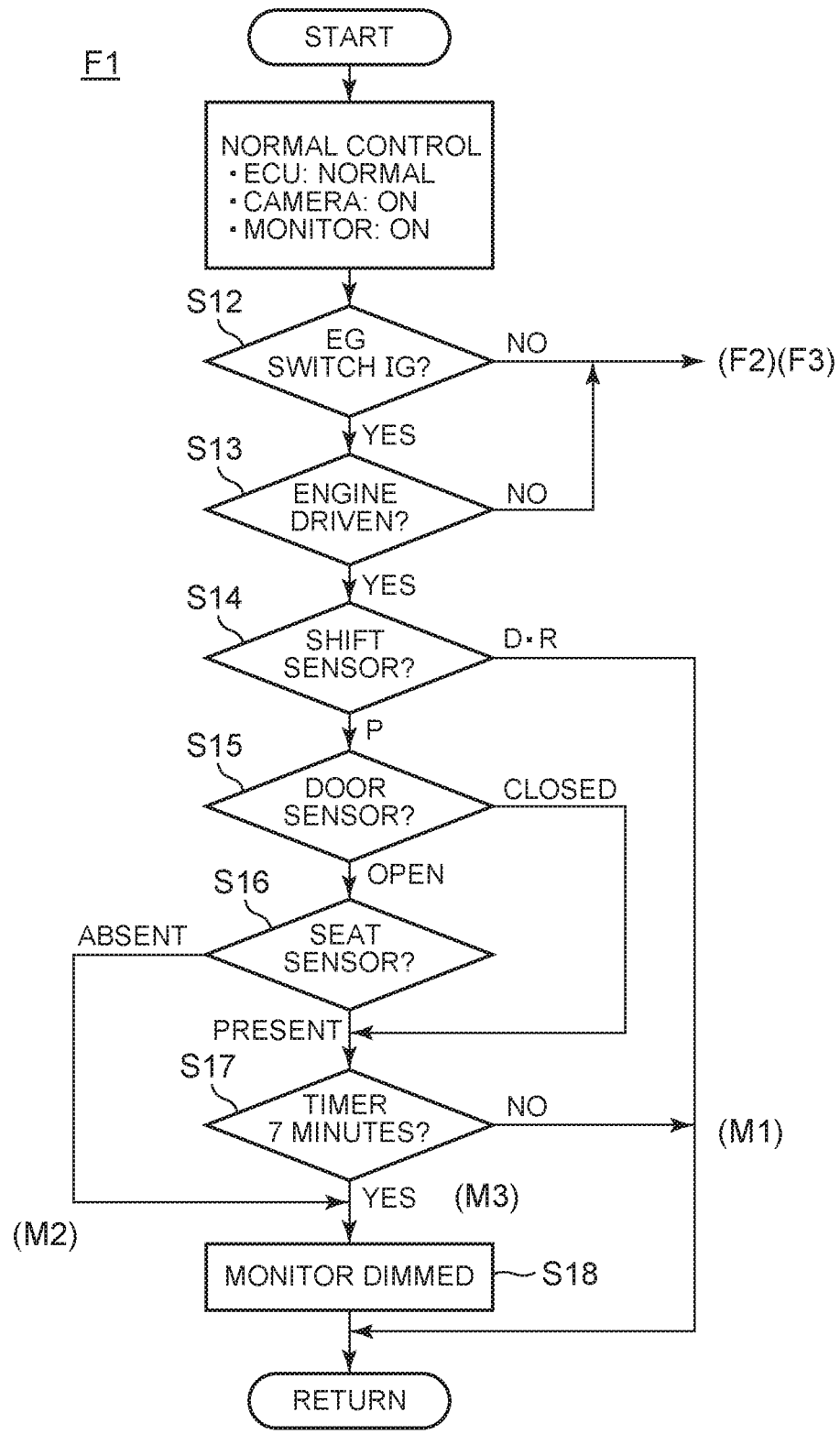
FIG. 5 is a flowchart of a flow F1 of modes M1 to M3.

In a flow F1 in FIG. 5 during driving of the engine, "normal control" is executed as a default of initial setting (S11). In the "normal control", the camera ECU 3, the monitor ECU 4, and the body ECU 5 are controlled to "normal", and the camera 1 and the monitor 2 are simultaneously controlled to "ON".

Next, the body ECU 5 detects a state of the EG switch 6G. If the body ECU 5 detects that the EG switch 6G is set to "IG" (S12), the body ECU 5 next detects an engine state by the engine sensor 6E (S13). In step S12, if the state of the EG switch 6G is other than "IG", that is, if the state thereof is either "ACC" or "OFF", the process proceeds to flows F2, F3, which will be described below. If the body ECU 5 detects the "engine stop" in step S13, the process also proceeds to the flows F2, F3.

In step S13, if detecting the "engine driven", the body ECU 5 further detects a state of the shift sensor 6T (S14). If the shift sensor 6T is "D·R", the current state, that is, the state of the "normal control" is maintained. This corresponds to the mode M1 and is a state where the automobile travels. The camera 1 performs the normal capturing operation, and the camera ECU 3 outputs the captured signal as the image signal to the monitor ECU 4. Based on the image signal, the monitor ECU 4 sends the display signal to the monitor 2, and a captured side or rear image of a host vehicle is displayed on the monitor 2 with specified brightness. This control in the mode M1 is executed regardless of opening/closing of the door and the presence/absence of the person on the seat.

If the shift sensor 6T is "P" in step S14, the body ECU 5 determines a state of the door sensor 6D (S15). If detecting that the door sensor 6D is "closed", the body ECU 5 measures a time since the shift sensor 6T is detected as "P", that is, the time since the shift sensor 6T is switched to "P" by using the timer 7. On the other hand, if detecting that the door sensor 6D is "open", the body ECU 5 detects a state of the seat sensor 6S (S16). If detecting that the seat sensor 6S is "present", the body ECU 5 also measures the time since the shift sensor 6T is detected as "P" by using the timer 7 (S17). Until a specified time, that is, seven minutes herein elapses in the timer 7, the mode M1, which is controlled in step S14, is maintained.

After seven minutes elapses in the timer 7 since the shift sensor 6T is switched to "P", the camera ECU 3, the monitor ECU 4, and the body ECU 5 are maintained to "normal", and the monitor 2 is controlled to be "dimmed" while the camera 1 is maintained to be "ON" (S18). This corresponds to control in the mode M2. A probability that the driver causes movement of the automobile is currently low, and thus a possibility of use of the monitor 2 is low. However, the image is minimally displayed on the monitor 2, so as to secure safety.

In step S16, also, if the seat sensor 6S is "absent", the monitor 2 is controlled to be "dimmed" while the camera ECU 3, the monitor ECU 4, and the body ECU 5 are maintained to "normal", and the camera 1 is maintained to "ON" (S18). Then, the mode is switched to the mode M3. From the above, because it is estimated that the driver temporarily gets off the automobile, the monitor 2 displays the image in such brightness that the image can minimally be checked. In this way, the driver on the outside of the vehicle can check the image on the monitor 2.

Just as described, when the engine is driven, the normal control state in the mode M1 is maintained in principle, and the side or rear image of the host vehicle, which is captured by the camera 1, is displayed on the monitor 2 in a bright state. In this way, the safety is secured by the CMS. Meanwhile, if it is determined that it is currently in a situation where a possibility of use of the CMS by the driver is low, the control in the mode M2 or the mode M3 is executed. Then, the monitor 2 is "dimmed" to display the image in the minimum brightness. In this way, the consumed power is reduced while the safety is secured by the CMS.

Note that, although not shown in FIG. 4, a situation where the EG switch 6G detects "IG" but the engine sensor 6E detects the "engine stop" corresponds to a state before the EG switch 6G is switched to a starter to start the engine or a case where the engine is unintentionally stopped. In this case, because a probability of driving the automobile is high, the state of "normal control" is preferably maintained. Alternatively, the control in the modes M4, M5 is executed, and the control in the modes M4, M5 is similar to a case where the EG switch 6G is "ACC" as shown in a flow F2 below.

Here, although not shown, a sensor that detects a state of a side brake of the automobile may be connected to the body ECU 5, and this sensor of the side brake may be combined with the shift sensor 6T. Similar control to the control that is executed when the shift sensor 6T detects "P" can be executed by combining detection of "N" of the shift sensor 6T and detection of "ON" of the side brake.

Modes M4, M5

Figure 6:
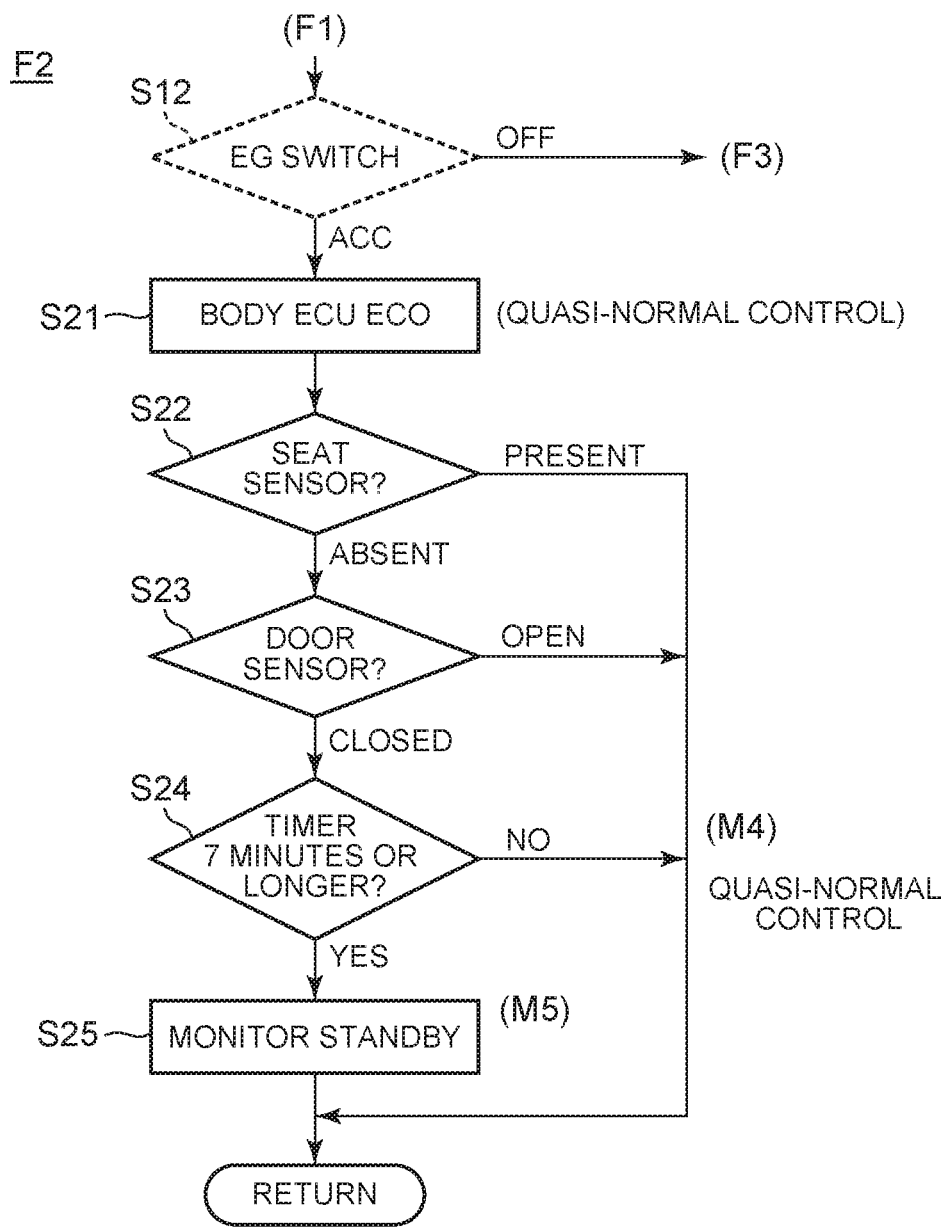
FIG. 6 is a flowchart of a flow F2 of modes M4 and M5.

If the EG switch 6G is "ACC" in step S12 of the flow F1 described above during ACC, or if the "engine stop" in step S13, the flow F2 in FIG. 6 is executed. This indicates a time when the EG switch 6G is detected as "ACC", the engine is stopped, and the automobile does not travel. Thus, the body ECU 5 controls itself to "ECO" (S21). With this control to "ECO", while the body ECU 5 secures the control of the CMS, the power consumption by the control related to traveling of the automobile can be reduced.

Here, this control to "ECO" by the body ECU 5 is referred to as a "quasi-normal control". More specifically, in this "quasi-normal control", the body ECU 5 is in "ECO", the camera ECU 3 and the monitor ECU 4 are "normal", and both of the camera 1 and the monitor 2 are "ON".

In addition, during "ACC", the shift sensor 6T is normally in "P" or "N". Thus, the shift sensor 6T needs not be detected particularly. However, it is assumed herein that "P" is detected.

Next, the seat sensor 6S is detected (S22). If the seat sensor 6S detects "present", the "quasi-normal control" is maintained. If the seat sensor 6S detects "absent" in step S22, the door sensor 6D detects "closed" or "open" (S23). If the door sensor 6D detects "open", the "quasi-normal control" is maintained. The "quasi-normal control" that includes these steps corresponds to the mode M4. In these situations, the driver waits while being seated, or gets on the automobile again after getting off once. Thus, it is considered that a possibility that the driver starts driving again is high.

On the other hand, if the door sensor 6D detects "closed" in step S23, the time since the door is closed is measured by the timer 7 (S24). Until a specified time, for example, seven minutes elapses, the "quasi-normal control", that is, the mode M4 is maintained. When seven minutes elapses, the monitor 2 is controlled to "standby" (S25). This corresponds to the mode M5, and thus it is considered the possibility that the driver starts driving again is low. The display screen of the monitor 2 that is controlled to "standby" is brought into a blackout state. However, at a moment that the driver opens the door or is seated on the seat, the monitor 2 is resumed to the displaying state and thus can response to the CMS. In addition, due to "standby", the consumed power by the monitor 2 is reduced.

Modes M6 to M9

Figure 7:
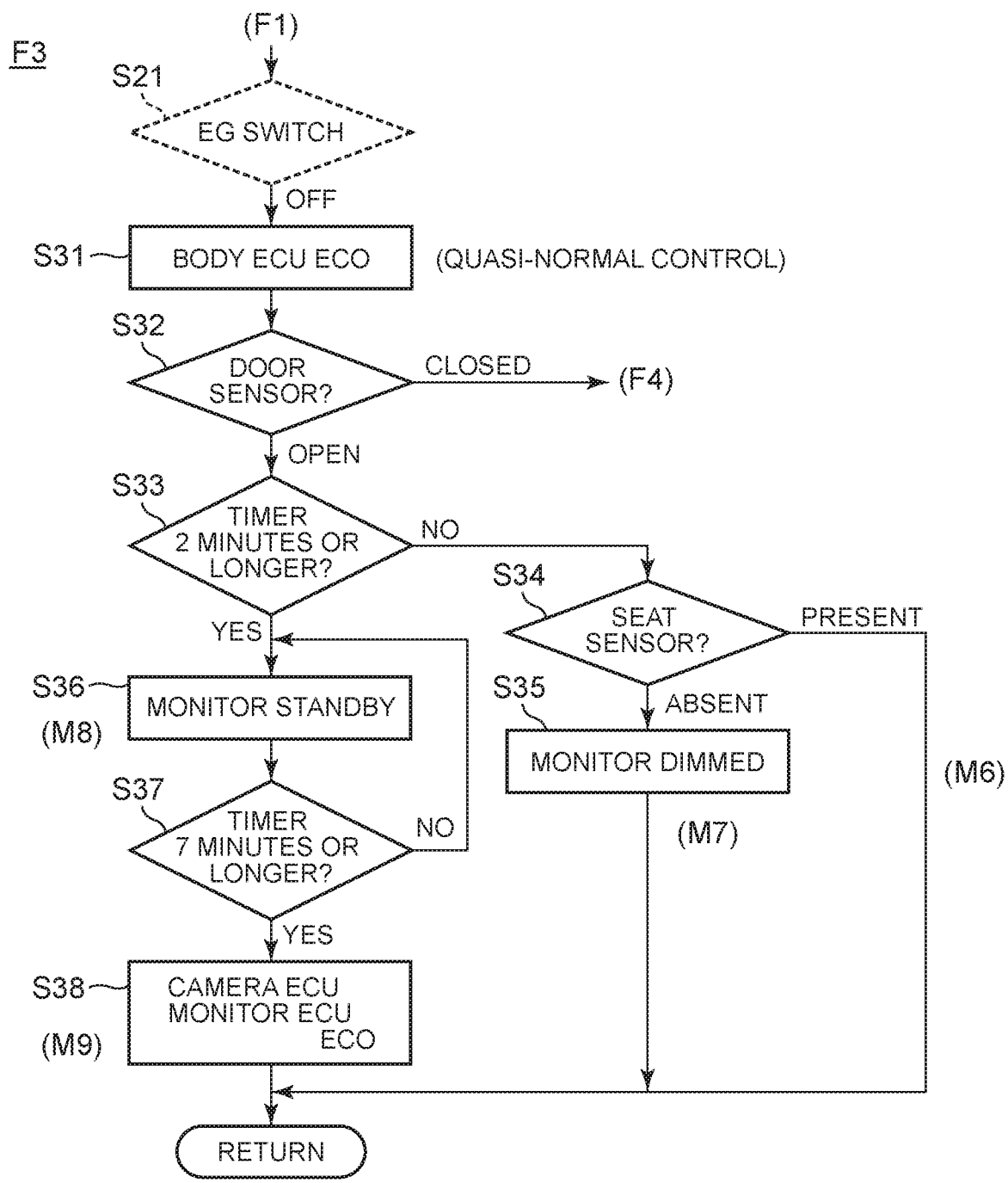
FIG. 7 is a flowchart of a flow F3 of modes M6 to M9.

If the EG switch 6G is detected to be "OFF" in step S12 of the flow F2 in FIG. 6 during the door "open", a flow F3 in FIG. 7 is executed. In this case, the engine is normally stopped, and the gear shift is normally in "P" or "N". Thus, the engine sensor 6E and the shift sensor 6T are not detected. In addition, it is normally configured that the power is not supplied to the body ECU 5 when the EG switch 6G is "OFF". However, in this embodiment, similar to step S21 of the flow F2, the body ECU 5 executes the "quasi-normal control", so as to control itself to "ECO" (S31). In this way, the control of the CMS is minimally secured.

In this flow F3, if the door sensor 6D detects "closed" (S32), a flow F4, which will be described below, is executed. If the door sensor 6D detects "open", the timer 7 measures a specified time that is two minutes here (S33). Until two minutes elapse, the seat sensor 6S performs the detection (S34). "Present" detected by the seat sensor 6S means that the driver gets on the automobile, and "absent" means that the driver gets off the automobile. If "present", the "quasi-normal control" is maintained. This corresponds to the mode M6, the monitor 2 is "ON" and displays the image in the bright light. Even if the EG switch 6G is "OFF", the driver is seated. Thus, in order to secure the safety upon getting off of the automobile later, the monitor 2 can be checked.

If "absent" in step S34, the monitor 2 is "dimmed" and is controlled for power saving (S35). This corresponds to the mode M7, and the power of the monitor 2 is saved. It is considered that the driver is currently getting off the automobile, or is a time immediately after the driver gets off the automobile. Thus, the monitor 2 continues displaying the image. However, it is considered that there occurs no trouble even when the brightness of the display screen is lowered.

If two minutes elapses since the door sensor 6D detects "open" in step S33, the monitor 2 is controlled to "standby" regardless of the detection by the seat sensor 6S, that is, regardless of "present" or "absent", and the screen of the monitor 2 is brought into the blackout state (S36). This corresponds to the mode M8, and the power of the monitor 2 is saved. Note that "-" in the table of FIG. 4 represents that the component with the symbol does not influence the state. When two minutes elapses since "open", it is considered that the driver has already gotten off the automobile or that a possibility that the seated driver does not drive the automobile is high. Thus, it is preferred to reduce the power consumption by the monitor 2 as much as possible.

Furthermore, the timer 7 continues measurement (S37). If seven minutes elapses since the door sensor 6D detects "open", both of the camera ECU 3 and the monitor ECU 4 are set to "ECO" (S38) while the "standby" control of the monitor 2 in step S36 is maintained. This corresponds to the mode M9, and the power of the monitor 2, the camera ECU 3, and the monitor 4 is saved. When seven minutes elapses since "open", it is considered that the driver is in a state of almost reliably getting off the automobile or that the driver does not drive the automobile. Thus, the power of the CMS including the monitor 2 is controlled to the minimum.

Modes M10 to M14

Figure 8:
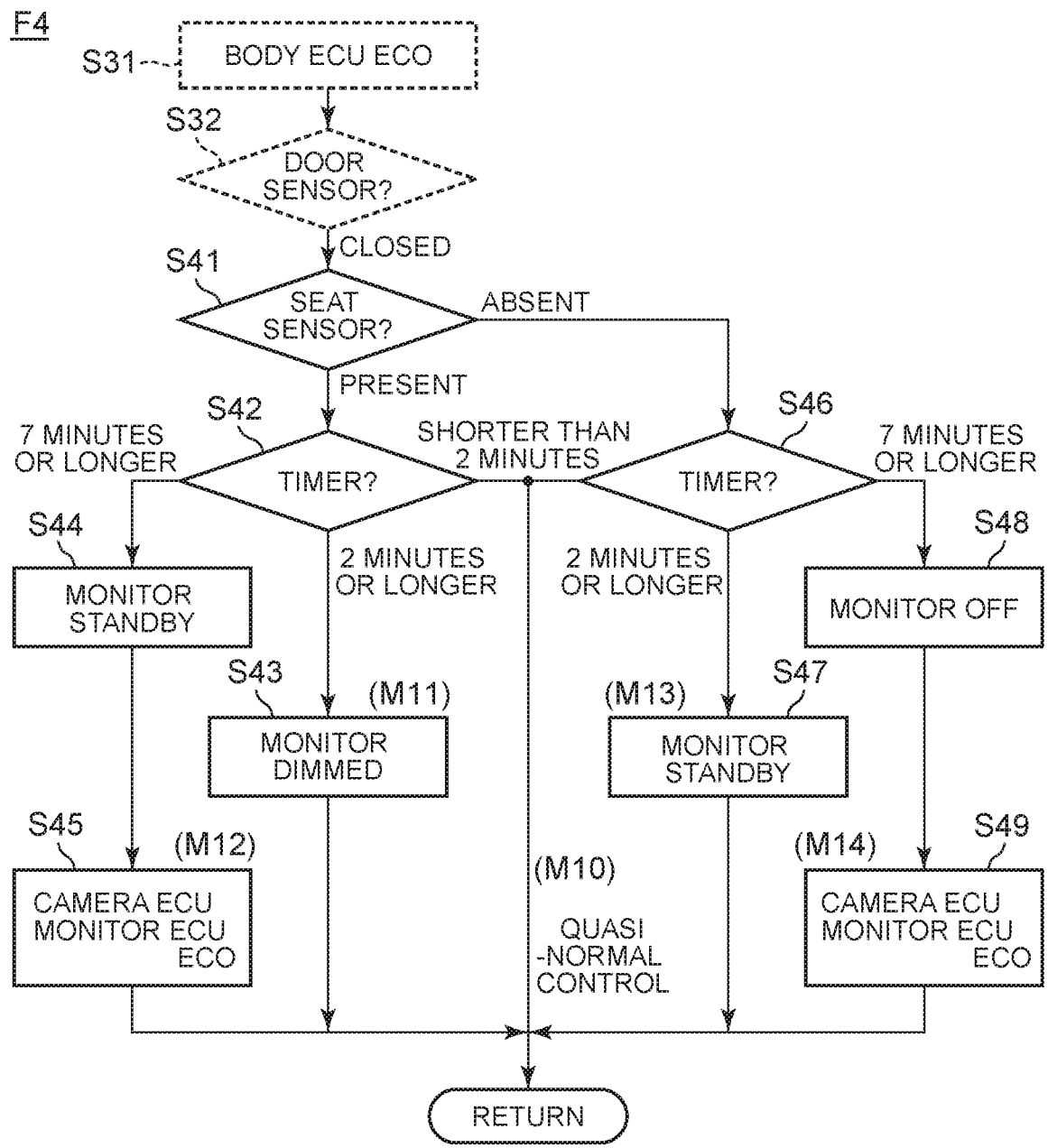
FIG. 8 is a flowchart of a flow F4 of modes M10 to M14.

If the body ECU 5 is controlled to "ECO" in step S31 of the flow F3 in FIG. 7 during the door being "closed", the "quasi-normal control" is executed, and the door sensor 6D detects "closed" in following step S32, the flow F4 in FIG. 8 is executed. The seat sensor 6S detects "present" or "absent" (S41). If "present" is detected, the timer 7 measures a time since the detection of "present" (S42). The "quasi-normal control" is maintained until two minutes elapse. This corresponds to the mode M10, and the control therein is the same as that in the mode M6. Although the EG switch 6G is "OFF", the driver does not get off the automobile. Thus, the monitor 2 can be checked to continuously secure the safety.

If it is detected in step S42 that two minutes elapses since "present", the monitor 2 is "dimmed" (S43). This corresponds to the mode M11. The driver is still seated, and it is not clear whether the driver is going to get off the automobile soon later or starts driving again. Accordingly, the power of the monitor 2 is saved while the monitor 2 continues displaying the image.

If seven minutes elapses, the monitor 2 is set to "standby" (S44). This corresponds to the mode M12. Although the driver is seated, the possibility that the driver starts driving again is low. Accordingly, the monitor 2 stops displaying the image, and both of the camera ECU 3 and the monitor ECU 4 are controlled in "ECO" (S45). In this way, the power is further saved.

On the other hand, if "absent" is detected in step S41, the timer 7 measures a time since the door being "closed" is detected (S46). The "quasi-normal control" is maintained until two minutes elapse (S43). This corresponds to the above-described mode M10. It is considered that the driver has gotten off the automobile and closed the door. Accordingly, the monitor 2 continues displaying the image for the time. However, it is considered that there occurs no trouble even when the brightness of the display screen is lowered.

If it is detected in step S46 that two minutes elapses since the detection of "closed", the monitor 2 is controlled to "standby" (S47). This corresponds to the mode M13. Because it is considered that the driver has completely gotten off the automobile, the monitor 2 stops displaying the image. However, it is also considered that the driver may get on the automobile soon again. Thus, the monitor 2 is prepared to instantaneously display the image.

After seven minutes elapse, the monitor 2 is turned "OFF" (S48). This corresponds to the mode M14. It is considered that the driver has completely gotten off the automobile and that the driver is unlikely to get on the automobile again. Thus, a possibility that the monitor 2 is instantaneously resumed to display the image is low. In this mode M14, the monitor 2 is turned "OFF". Thus, the consumed power by the monitor 2 is minimized, and a high power saving effect can be obtained. Furthermore, both of the camera ECU 3 and the monitor ECU 4 are controlled in "ECO" (S49). Thus, the power can further be saved.

By executing the control in the modes M1 to M14 that has been described so far, checking by using the monitor 2 is secured in the situation where the driver is required to check the side or rear area of the automobile or the situation where the driver preferably check the side or rear area of the automobile. In addition, the power saving by the monitor 2 or the side camera 1, the camera ECU 3, the monitor ECU 4, and the body ECU 5 can be realized. In this way, the safety is secured by the CMS, and power saving can be realized.

The configuration of the CMS and the control modes in the modes M1 to M14 that have been described so far merely illustrate one example of the disclosure. In particular, it is needless to say that modes other than the modes M1 to M14 can be applied. For example, the specified time that is measured since the detection of the situation by the sensor is not limited to two minutes or seven minutes described in the embodiment but can be set to an appropriate time.

As the sensors of the CMS in the disclosure, a sensor that detects a locked state by a door key or whether the driver touches a steering wheel (a wheel), the seated state of the driver that is analyzed by an image using a vehicle cabin camera, and the like may be used.

In regard to "dimmed" of the monitor according to the disclosure, the monitor does not always have to be controlled in specified brightness. However, the brightness, that is, a degree of being "dimmed" may differ in accordance with a situation. In this case, the brightness of environment in/around the automobile may be taken into consideration.

In this embodiment, the example in which the left and right side cameras 1L, 1R and the left and right side monitors 2L, 2R are simultaneously controlled in the same mode has been described. However, depending on a situation, each of the left and right side cameras and the left and right side monitors may be controlled in an independent state. For example, while the left side camera and the left side monitor on a passenger's seat side may be controlled in "normal", the right side camera and the right side monitor on the driver's seat side may be controlled in "ECO". Alternatively, they may be controlled reversely.

For example, as shown in FIG. 1, the disclosure can also be applied to a CMS that uses a back camera (a rear camera) 1B provided in a rear section of the automobile in addition to the left and right side cameras. In this case, an image captured by the back camera 1B is displayed on the center monitor 2C, and the images captured by the left and right side monitors 2L, 2R are synthesized to display one sequential image. In this way, these monitors 2C, 2L, 2R can be configured as monitors that display a wide area from the left and right sides to the rear of the automobile CAR.

Furthermore, the disclosure can also be applied to an automobile that includes left and right side mirrors. In particular, in an automobile in which side marker lamps and turn signal lamps are respectively and integrally incorporated in the left and right side mirrors, the side cameras can be incorporated in these lamps.

Instead of being incorporated in the lamps, the side cameras may be incorporated in a body of the automobile, such as a fender, doors, or pillars.

The CMS of the disclosure does not always have to be configured to constantly execute the power saving control but may be configured to turn off the power saving control (low power consumption control), for example, when the passenger operates a switch, and may be configured that the monitor constantly displays the image normally.

What is claimed is:

1. A camera monitor system comprising:
at least one camera configured to capture an image of an outside of a vehicle;
at least one display configured to display the captured image;
a detector configured to detect an open/closed state of a door and a seated state of a driver; and
at least one electronic control unit configured to control power consumed by the at least one camera and the at least one display on the basis of a detection output of the detector and an operational mode, wherein the at least one electronic control unit controls at least one of the at least one camera or the at least one display to a low power consumption state based on a determination of the operational mode and a determination that a specified time has elapsed since the detection output of the detector has been changed;
wherein the operational mode comprises a first mode and a second mode, and the operational modes are selected based on a state of an engine switch of the vehicle and a state of an engine.

2. The camera monitor system according to claim 1, wherein:
the at least one camera comprises left and right cameras, each of which captures an image of an area from a side to a rear of an automobile; and
the at least one display comprises left and right monitors that respectively display left and right captured images.

3. The camera monitor system according to claim 1, wherein the at least one electronic control unit controls a display screen of the at least one display to be dimmed based on a determination that a specified time has elapsed since the gear shift is set in parking in a case where the engine is driven.

4. The camera monitor system according to claim 1, wherein in a case where the engine is stopped, the at least one electronic control unit brings the at least one display into a standby state after a first specified time elapses since the door is closed, and controls the at least one display to be OFF after a second specified time that is longer than the first specified time elapses.

5. The camera monitor system according to claim 1, wherein the at least one electronic control unit controls the displaying device to be operated normally based on a detection that the driver is seated while the engine is stopped and the door is open, and controls the at least one display to a standby state based on a detection that the driver is not seated.

6. The camera monitor system according to claim 1, wherein the at least one electronic control unit controls the at least one display to be dimmed based on a detection that the engine is stopped and a specified time has elapsed since the gear shift was set in parking.

7. The camera monitor system according to claim 1, wherein, when the detection output of the detector regarding a state of the gear shift, the open/closed state of the door, or the seated state of the driver has been changed before the determination that the specified time has elapsed, the at least one electronic control unit does not control at least one of the at least one camera or the at least one display to a low power consumption state.

8. The camera monitor system according to claim 1, wherein the specified time is two minutes or greater.

* * * * *